US012480926B2

(12) United States Patent
Zaman et al.

(10) Patent No.: US 12,480,926 B2
(45) Date of Patent: Nov. 25, 2025

(54) SYSTEMS, DEVICES, AND METHODS FOR ULTRASONIC AGITATION MEDIATED KINETIC RELEASE TESTING OF COMPOUNDS

(71) Applicant: Trustees of Boston University, Boston, MA (US)

(72) Inventors: Muhammad Zaman, Sharon, MA (US); Andrew J. Acevedo, Jamaica Plain, MA (US); Ray Glynn Holt, Boston, MA (US); Darash Desai, Brookline, MA (US)

(73) Assignee: Trustees of Boston University, Boston, MA (US)

( * ) Notice: Subject to any disclaimer, the term of this patent is extended or adjusted under 35 U.S.C. 154(b) by 892 days.

(21) Appl. No.: 16/982,501

(22) PCT Filed: Mar. 19, 2019

(86) PCT No.: PCT/US2019/023019
§ 371 (c)(1),
(2) Date: Sep. 18, 2020

(87) PCT Pub. No.: WO2019/183130
PCT Pub. Date: Sep. 26, 2019

(65) Prior Publication Data
US 2021/0018482 A1    Jan. 21, 2021

Related U.S. Application Data

(60) Provisional application No. 62/654,983, filed on Apr. 9, 2018, provisional application No. 62/644,670, filed on Mar. 19, 2018.

(51) Int. Cl.
*G01N 33/15*    (2006.01)
*B01F 31/85*    (2022.01)
(Continued)

(52) U.S. Cl.
CPC .............. *G01N 33/15* (2013.01); *B01F 31/85* (2022.01); *C04B 40/0021* (2013.01); *G01N 29/34* (2013.01)

(58) Field of Classification Search
CPC . G01D 3/08; G01D 3/036; G01D 1/04; G01C 21/165; G01C 25/005; G06F 18/2113; G06F 18/251
(Continued)

(56) References Cited

U.S. PATENT DOCUMENTS 6,719,449 B1 *   4/2004   Laugharn, Jr. ...... B01F 35/2115
                                                          366/127
7,843,556 B2    11/2010   Babichenko et al.
(Continued)

OTHER PUBLICATIONS

Acevedo, A. et al., "Small volume method for drug release screening using ultrasonic agitation," Analyst, vol. 143, No. 19, Sep. 24, 2018, abstract.
(Continued)

*Primary Examiner* — Lee E Rodak
*Assistant Examiner* — Byung Ro Lee
(74) *Attorney, Agent, or Firm* — Nutter McClennen & Fish LLP (57) ABSTRACT

Systems, devices, and methods for kinetic release testing of compounds are discussed herein. Ultrasonic agitation, with resultant cavitation and acoustic streaming, is used to breakdown and release drugs from one or more compounds to form a solution. The system uses small volumes of solvent to increase accessibility and portability of the system. Once dissolved, the solution is passed to a sampling system for calculating kinetic release behavior. The kinetic release behavior can be compared to existing reference data to identify the compound and/or confirm accurate manufacture by comparison of dissolution characteristics of the active ingredients. In some embodiments, streak photography and
(Continued)

hydrophone measurements are used to study the effects of system parameters on the acousto-hydrodynamic environment.

15 Claims, 5 Drawing Sheets

(51) Int. Cl.
  *C04B 40/00* (2006.01)
  *G01N 29/34* (2006.01)
(58) Field of Classification Search
  USPC .......................................................... 73/1.83
  See application file for complete search history.

(56) References Cited

U.S. PATENT DOCUMENTS

| | | | |
|---|---|---|---|
| 2002/0009015 A1* | 1/2002 | Laugharn, Jr. ........... | B01J 19/10 366/108 |
| 2005/0191614 A1* | 9/2005 | Cima ........................ | C30B 7/00 702/19 |
| 2007/0020662 A1* | 1/2007 | Cima ..................... | G16B 35/00 435/7.1 |
| 2011/0159078 A1 | 6/2011 | Burton et al. | |
| 2013/0177922 A1 | 7/2013 | Laugharn, Jr. et al. | |

OTHER PUBLICATIONS

Desai, D. et al., "Continuous Flow Microfluidic Solution for Quantitative Analysis of Active Pharmaceutical Ingredient Content and Kinetic Release," Analytical Methods, vol. 7, Jan. 19, 2015, 10 pages.

International Search Report and Written Opinion for International Application No. PCT/US2019/023019, mailed May 30, 2019, 12 pages.

International Preliminary Report on Patentability for International Application No. PCT/US2019/023019, mailed Jun. 9, 2020, 16 pages.

Yeap, E. et al., "Microfluidic Extractive Crystallization for Spherical Drug/Drug-Excipient Microparticle Production," Organic Process Research & Development, 2019, vol. 23, pp. 375-381.

* cited by examiner

SYSTEMS, DEVICES, AND METHODS FOR ULTRASONIC AGITATION MEDIATED KINETIC RELEASE TESTING OF COMPOUNDS

The present application claims priority from international application PCT/US2019/023019, filed Mar. 19, 2019, which claims priority from U.S. Provisional Application 62/644,670, filed Mar. 19, 2018, and U.S. Provisional Application 62/654,983, filed Apr. 9, 2018, all of which are incorporated herein, in their entirety by reference.

This invention was made with Government support under Contract No. AID-OAA-A-15-00029 awarded by the U.S. Agency for International Development. The Government has certain rights in this invention.

FIELD OF INVENTION

The present invention relates to systems, devices, and methods for solid dissolution and kinetic release testing of compounds, and, more particularly, to using ultrasonic agitation to breakdown and dissolve compounds to analyze their kinetic release behavior.

BACKGROUND ART

Early connections of solid dissolution and in vivo performance of orally administered tablets in the pharmaceutical literature can be dated back to the 1950s. Since then, drug release testing for manufacturing quality control, or dissolution testing, has become standardized across pharmacopeias globally, including the United States Pharmacopeia (USP), as the connection between dissolution and bioavailability has become more appreciated. Drug release testing has been incorporated along the entire process of solid dosage form development and manufacturing, such as for preliminary testing during the drug discovery and formulation development phase, bioequivalence studies to compare in vitro release behavior to in vivo bioavailability, and quality control during and after dosage form manufacturing. In addition to being used as quality control measures throughout the manufacturing process to ensure batch-to-batch consistency, dissolution tests have also been used to identify substandard tablets in the global market.

Due to their burgeoning popularity, USP monographs of many commercially available tablets and capsules now contain standardized dissolution requirements. Current apparatuses for dissolution testing use forced convection to achieve solid dissolution. These apparatuses typically require up to 1 liter of solvent, or dissolution media, per tablet, making the testing of multiple tablets resource-intensive. Testing protocols are also highly regulated, with everything from the dimensions of the mixer to the vibrational stability of the apparatus defined and controlled.

SUMMARY OF THE INVENTION

In accordance with some embodiments of the present invention, methods and systems test characteristics of a compound. To that end, the methods and systems may combine the compound with a solvent to form a sample, activate a sonicator to agitate the sample to transform the sample into a solution, and sample the solution at a plurality of time intervals. The methods and systems also may determine kinetic release behavior of the compound in solution as a function of data related to the samplings, compare the data of the samplings with a reference data set of kinetic release behavior of the compound to form a result, and then produce an output. The methods and systems also can further couple the sonicator to a horn for agitating the sample to transform the sample into the solution. In some embodiments, the method can further adjust one or more of an amplitude setting of the sonicator, frequency of applied ultrasonic signal, diameter of the horn, and geometry of the horn to change a rate of transformation of the sample into the solution. Moreover, the method may further adjust a probe height of the horn to change a rate of transformation of the sample into the solution. Further, the method may further adjust an acoustic dosing of the sonicator to change an amount of acoustic energy delivered to the solution per unit time. Among other times, the systems and methods may sample during agitation of the sample.

Among other things, the output can identify a composition of the compound. For example, the output may identify the compound. Moreover, the system and methods further can sample the solvent prior to sampling the solution to establish the reference data set.

In accordance with other embodiments, methods and systems quantify target release of a compound. To that end, the methods and systems combine the compound with a solvent, and agitate the combination to dissolve the compound within the solvent using ultrasonic agitation. As such, the compound releases one or more ingredients during dissolution. In addition, the methods and systems collect a sample of the dissolved compound at a plurality of time intervals, detect an amount of the ingredients in each sample to determine a value, and compare the values to reference values. The methods and systems then may generate an output that describes a relationship between the values and the reference values.

In accordance with alternate embodiments of the present invention, sampling can occur during agitation of the sample. Moreover, the output can identify the compound. In some embodiments, the method can further adjust one or more of an amplitude setting of the ultrasonic agitation, acoustic dosing of the sonicator, probe height of a horn, frequency of applied ultrasonic signal, diameter of a horn, and geometry of a horn to change a rate of transformation of the sample into the solution. Further, in some embodiments, the method can further adjust a height from which the agitation is emitted to change a rate of transformation of the sample into the solution.

In accordance with other embodiments of the present invention, methods and systems test kinetic release behavior of compounds. The methods and systems include a compound in a solution, where the compound has one or more active ingredients therein, a vessel configured to store one or more compounds therein, and a sonicator configured to produce cavitation and acoustic streaming delivered to the one or more compounds in the vessel. The methods and systems further may include a sampling device configured to extract a portion of the compound from the vessel, and a computer configured to measure kinetic release behavior of the compound.

The sonicator can be disposed external to the sample when transforming the sample into the solution. Moreover, the sampling device further may have one or more testing apparatuses for collecting data of the compound. Among other things, the methods and systems further may include a horn, coupled to the sonicator and configured to be received in the vessel such that at least a portion of the horn contacts one or more of the compound and the solution. The vessel can be configured to store a volume of 100 milliliters or less of a solvent for dissolving the compound therein. In some embodiments, the computer is configured to produce an output that includes the kinetic release behavior. Further, the system can be portable.

BRIEF DESCRIPTION OF THE DRAWINGS

The foregoing features of the invention will be more readily understood by reference to the following detailed description, taken with reference to the accompanying drawings, in which.

DESCRIPTION OF ILLUSTRATIVE EMBODIMENTS

In illustrative embodiments, ultrasonic agitation is used to breakdown and dissolve tablets to test drug release, which can be used to identify the drug contained therein and/or confirm an amount of one or more ingredients, e.g., an active ingredient or another component of the compound, contained therein. In an exemplary embodiment, a compound and a solvent can be combined to form a sample. Ultrasonic energy can then be delivered to the sample via a sonicator or an ultrasonic generator to agitate the sample, thereby promoting dissolution of the tablet and forming a solution. The solution can be sampled during a plurality of time intervals at varying system parameters to measure a kinetic release behavior of the compound in the solution. The kinetic release behavior of the compound over the sampling time period can be compared to reference values for the drug by a computer to identify the compound. The results can be aggregated and produced to the user in the form of an output. Details of various embodiments are discussed below.

Figure 1:
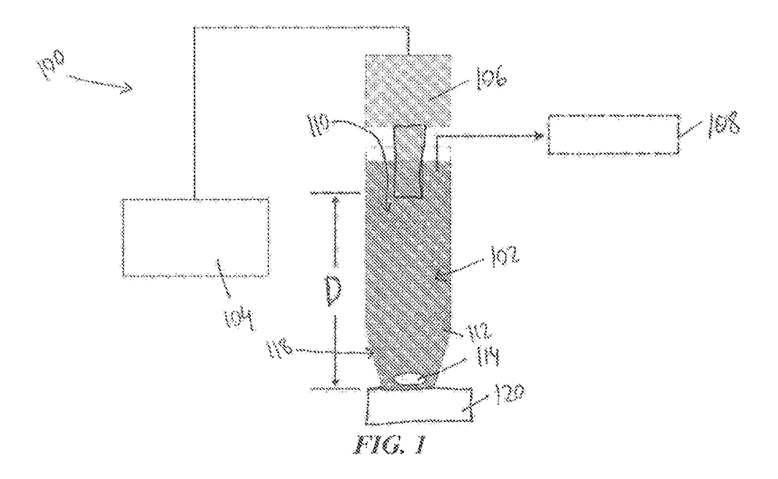
FIG. 1 schematically illustrates an exemplary embodiment of a system for kinetic release testing of compounds using ultrasonic vibrations.

FIG. 1 schematically shows an exemplary embodiment of a setup or system 100 that can be used for kinetic release testing of compounds. The system 100 can include a vessel 102 for containing a solution or liquid, and a generator 104 for powering an attached transducer 106. The transducer 106 can be positioned within the vessel 102 such that the transducer contacts one or more of the substances also contained in the vessel 102. One or more of the vessel 102 and the generator 104 can be in communication with a sampling system 108 that can be configured to extract samples of the substance from the vessel 102 for testing, as described further below.

The components of the system 100 are described in greater detail below. For example, the vessel 102 can define a central opening 110 for receiving one or more substances. As shown, the vessel 102 can resemble a test tube, e.g., round-bottom test tube (BRAND®, Sigma-Aldrich, St. Louis, MO), containing the substances, though, in some embodiments, the vessel 102 can have varying geometries, such as a beaker, glass, cup, bowl, or another chamber that can retain these substances. Among other things, the vessel 102 can be made of plastics, such as polyurethane polyethylene, polycarbonate, and Teflon, other fluorinated polymers, glass, and/or stainless steel. A person having ordinary skill in the art will appreciate that other materials can also be used to make up the vessel 102 so long as those materials are compatible with the solvents and/or compound contained therein.

A volume of the vessel 102 can vary, though a person skilled in the art can choose the volume of the vessel 102 to minimize and/or prevent spillage of a solvent 112 and/or compound during sample preparation and/or agitation, whether during and after sampling. For example, for a 50 milliliter sample, a vessel 102 having a 100 milliliter volume or less, or a 70 milliliter volume or less can be used. In some embodiments, the volume of the vessel 102 can be chosen to promote portability of the system 100, as described further below.

It will be appreciated that the material and/or geometry of the vessel 102 can impact the rate of transformation of a sample within the vessel 102 into a solution, as discussed further below. For example, the thickness of vessel 102 can be modulated to promote or impede transmission and/or propagation of the acoustic signal through the material. Moreover, the material and/or geometry of the vessel 102 can impact the extent to which the acoustic signal is reflected and/or transmitted at the surfaces of the vessel 102.

The vessel 102 can contain a sample 118 for drug release testing. The sample 118 can include one or more dissolution media or solvents 112 containing one or more compounds 114. Among other things, the solvent 112 can include one or more of ethanol, filtered water, sodium dodecyl sulfate solutions, phosphate buffered saline solutions, acidic/basic aqueous solutions, and organic solvents. It will be appreciated that a wide array of solvents can be used so long as those solvents are compatible with other components of the system 100. For example, in some embodiments, the solvent 112 can be chosen based on the compound 114 to ensure that the compound 114 is soluble in the solvent 112. The vessel 102 can be filled to any of a plurality of different heights, though it will be appreciated that the vessel 102 should be sufficiently filled such that at least a portion of the solvent 112 can contact one or more of the generator 104 and/or the sampling system 108.

The compound 114 can include a variety of forms. As shown, the compound 114 can be in a solid form, such as a tablet, polymeric microparticle, soil sample, or hydrogel, though, it will be appreciated that the compound can be a solution, such a blood sample, syrup, paste, gel, and/or ointment. Some other examples of compounds 114 include prednisone, acetaminophen, ibuprofen, amodiaquine, artesunate, fenofibrate, carbamazepine, and/or other drugs known to a person skilled in the art. In some embodiments, the compound 114 can be configured with characteristics that impact the kinetic release behavior of the compound 114. For example, the compound 114 can be configured for extended, modified, or immediate release, disintegration, and/or effervescence.

To test drug release properties, the compound 114 can be combined with the solvent 112 to dissolve within the vessel 102. Solvents 112 can be chosen based on the compound 114 intended to be dissolved, though, a person having ordinary skill in the art will appreciate that the compound 114 can be chosen based on the solvent 112 to ensure adequate dissolution. The solvents 112 may also be heated or cooled to temperatures that further facilitate dissolution of the compound 114 or prevent dissolution of a subset of components comprising the compound 114. Further, although, in some embodiments, the compound 114 can be positioned at the bottom of the vessel 102, as shown in FIG. 1, the compound 114 can float in the solvent 112, or be suspended in solvent 112 within an acoustically transparent enclosure. The manner in which the compound behaves within the solvent can impact system parameters, such as amplitude settings and probe height of the transducer, as described further below.

In some embodiments, constant temperature of the solvent 112 can be maintained by regulating an acoustic dosage of the system 100. Acoustic dosage refers to pulsed versus continuous application of acoustic energy. Pulsed dosage is characterized by an on-time and off-time applied periodically. These on- and off-times can be modulated to control the amount of ultrasonic energy delivered within a fixed period of time. Among other things, this modulation can regulate or manage the temperature of the solvent 112 to ensure that it does not increase or drift over time, thereby indirectly impacting the dissolution rate. One having ordinary skill in the art will appreciate that acoustic dosage can also impact the behavior of fluid flow throughout the vessel 102. Modulation of the acoustic dosage can have an impact on advection of particles and fragments of the dissolving compound 114, which affects the underlying process as well as total test time. Exemplary pulsed dosages can include 500 milliseconds on-time and 500 milliseconds off-time (50% duty cycle, 1 Hz), but it will be appreciated that each of the on-time and off-time values can be varied.

The solvent 112 and the compound 114 can be introduced into the vessel 102 in a variety of ways. In some embodiments, each of the solvent 112 and the compound can be in a syringe prior to introduction into the vessel. Use of syringes can allow for exact measurements of the solvent 112 and the compound 114 to be used, minimizing the risk of testing errors. For example, a pre-determined amount of the solvent 112 can be measured out and stored in the syringe and dispensed into the vessel 102, though it will be appreciated that the solvent 112 can be stored in beakers, test tubes, or any similar structures used to store liquids. The compound 114 is stored in its native packaging and separately added to the vessel, though, in some embodiments, the compound 114 can similarly be stored in a beaker, test tube, or the like.

In some embodiments, additional syringes can include various reagents. For example, various reagents can be used to prepare reference samples, testing samples, and probe samples to be run through the system. The reagents can be mixed within the vessel 102 or outside of the vessel and added prior to preparation of the test sample to establish reference values for the compound. For example, in the event that the compound being tested is prednisone, a reference reagent of prednisone can be mixed with a solvent, e.g., ethanol, and run through the system 100 to collect kinetic release behavior data prior to testing the test sample. A person having ordinary skill in the art will recognize that the system 100 is prepped and cleaned for a new test after running the reference reagent through the system 100 and prior to testing the test sample, and vice versa. In some embodiments, the reference reagent and test sample may also be run through the system 100 simultaneously to determine values for each that provide continuous and real-time calibration of test results.

The generator 104 can be configured to cooperate with the transducer 106 to produce an acoustic wave/vibration that agitates the sample 118 in the vessel 102. Specifically, in illustrative embodiments, the generator 104 can release an ultrasonic soundwave that agitates a variety of media. The application of ultrasound, acoustic waves with frequencies greater than 20 kHz to liquid media, produces two unique phenomena: 1) ultrasonic cavitation and 2) acoustic streaming.

As known by those in the art, ultrasonic cavitation can refer to the formation, growth, and collapse of gas- or vapor-filled microbubbles in response to pressure fluctuations of the acoustic wave. These bubbles are either pre-existing or generated by the tensile rarefaction phase of the acoustic wave interacting with micro- or nanoscale impurities. The often violent collapse of these microbubbles results in local fluid pressures in the GPa regime, local temperatures above 1000° C., and collapse near solid surfaces results in a reentrant jet that can damage and erode soft ceramics and even hardened steel. Taken in aggregate, the inventors recognize that the effects of many tiny cavitation events increase reaction rates, open unique reaction pathways compared to traditional means of mechanical agitation, and fracture and ablate solids.

Primary acoustic streaming occurs because a propagating acoustic wave generates a body force owing to viscous absorption in the bulk fluid. One manifestation of such a process is generally referred to as the "acoustic radiation force." The resulting macro-scale fluid flow can further be enhanced by scattering particles and bubbles in the host fluid, which is a second manifestation of the acoustic radiation force. Depending on the intensity of the ultrasonic field and the geometry of the test chamber, fluid flow can be laminar, vortical, or turbulent. At the microscale, a second boundary-layer streaming flow, often referred to as "microstreaming", results directly from the cavitation bubble oscillations. Transport accelerates by high flow shearing rates occurring at micron-sized scales, compared to primary acoustic streaming.

The generator 104 can modulate a variety of parameters/settings, such as input power, amplitude, and so forth. For example, the generator 104 can include a frequency setting to regulate the frequency of the ultrasonic signal it produces. The frequency setting can range from approximately 20 kHz to approximately 100 kHz, from approximately 30 kHz to approximately 80 kHz, from approximately 35 kHz to approximately 50 kHz, or have a value of approximately 40 kHz. It will be appreciated that in some embodiments, there is no upper limit to the frequency setting so long as a higher driving pressure exists to induce cavitation as frequency increases.

The generator 104 also can include an amplitude setting (not shown). Specifically, the amplitude setting is related to acoustic power, with a higher amplitude setting resulting in a higher applied acoustic power. The amplitude setting can be set by the generator to determine the amplitude of the released signal. Some values of the amplitude can range from approximately 50 µm to approximately 500 µm, from approximately 100 µm to approximately 300 µm, from approximately 150 µm to approximately 200 µm, or have a value of approximately 180 µm, a value that coincides with a peak vibrational amplitude of certain models of the horn. The amplitude can determine the dissolution rate of the sample 118. An exemplary embodiment of the generator 104 can include the generator distributed as the Vibracell VCX134FSJ, by Sonics & Materials, Inc., of Newtown, CT, though those in the art should appreciate that amplitude settings can vary depending on the model of the generator.

The transducer 106 can be associated with the generator 104 in a variety of ways. In some embodiments, the generator 104 can include a flexible arm (not shown) attached to the transducer 104, while in other embodiments, the transducer 106 can couple to a distal end of the generator 104. The transducer 106 preferably converts electrical signal from the generator 104 to a mechanical vibration that results in an acoustic wave for transmission through the sample 118. A person having ordinary skill in the art will recognize that the transducer 106 includes a stack of piezo-electric discs (not shown) located at a distal end of the transducer 106 that receive the electrical signal and vibrate longitudinally in response to this signal to convert the electrical signal to the mechanical vibration. It will be appreciated that a type of transducer 106 used can vary, which can change the geometry of the piezo-electric discs contained therein, as well as the direction of vibration.

In some embodiments, the transducer 106 also can include a horn 116. The horn 116 can be configured to vibrate based on the amplitude of the signal received from the generator. The horn 116 can be made from a metal, e.g., titanium, alloy. Ultrasonic agitation emitted by the horn 116 can increase the surface area of the dissolving species and the mass transfer coefficient of the overall process, while also resulting in highly repeatable and tunable kinetic release behaviors from compounds.

For example, the horn 116 can have an amplitude setting or horn amplitude set and adjusted by the generator 104. In some embodiments, the horn can be stepped to produce a frequency and/or power of the kinetic energy that can be changed. For example, in some embodiments, the horn amplitude can be adjusted between 20-100% in 1% or fractional increments.

The horn 116 can have a tip (not shown) of varying diameter. In some embodiments, the diameter of the tip and/or the geometry of the horn can vary as so much as the resonant frequency of the horn 116 matches that of the input signal from the generator 104. The tip can be inserted into the solvent to emit the signal. In some embodiments, the diameter of the tip can range from approximately 2 millimeters to approximately 1,000 millimeters, from approximately 2.5 millimeters to approximately 600 millimeters, from approximately 2.75 millimeters to approximately 300 millimeters, from approximately 3 millimeters to approximately 50 millimeters, from approximately 3.18 millimeters to approximately 25 millimeters or have a value of about 3.18 millimeters.

In some embodiments, a stand 120 can support one or more of the components of the system 100. The stand 120 can support portions of the system 100 to ensure consistent radial placement of the transducer 106 and the vessel 102. While the stand 120 is schematically shown supporting the vessel 102, it will be appreciated that the stand 120 can support the generator 104 or the transducer 106 in addition to, or in lieu of, the vessel 102.

In some embodiments, the stand 120 can allow a distance D between a distal end of the tip of the horn 116 and a distal end of the vessel 102 to be adjusted. As shown, the distance D, which can be referred to as the probe height, can be dictated by geometry of the vessel 102 and/or the volume of the solvent. The probe height D indicates the distance that the signal travels from the horn 116 to the compound 114 for compounds located at the bottom of the vessel 102. The upper and lower limits of the distance D for the illustrated embodiment can be adjusted between the range of 25 millimeters to 65 millimeters, 30 millimeters to 60 millimeters, or 35 millimeters to 55 millimeters for a solvent volume of 50 milliliters, though it will be appreciated that the distance D can vary based on the geometry of the vessel 102 and/or volume of the solvent 112. In some embodiments, a limiting parameter of the probe height D can be a submersion depth of the horn 116 or, in some embodiments, a distal end of the transducer 106 that contacts the solvent 112. The tip of the horn 116 is submerged in the solvent 112 to varying degrees to emit the signal therethrough, which can be referred to as direct sonication. For example, in direct sonication, the tip of the horn 116 can be submerged approximately 5 millimeters or more, approximately 10 millimeters or more, approximately 15 millimeters or more, or approximately 20 millimeters or more. In some embodiments, the horn 116, or the tip thereof, can contact or be otherwise coupled to the compound 114.

In some embodiments, the system 100 can apply ultrasonic agitation to the solvent 112 without directly contacting the solvent 112 or being submerged therein, which can be referred to as indirect sonication. In indirect sonication, the system 100 can directly couple the transducer 106 and/or the horn 116 to an outside surface of the vessel 102 and/or submerge the vessel 102 in a bath sonicator (not shown) where acoustic waves are transported through a coupling fluid to the vessel 102. In this arrangement, the solvent 112 is agitated to dissolve the compound therein without having to clean either of the transducer 116 and/or the horn 116 between tests. It will be appreciated that, in some embodiments, one or more parameters of the system 100, e.g., amplitude setting of the ultrasonic agitation, acoustic dosing of the sonicator, probe height of the horn 116, frequency of applied ultrasonic signal, diameter of the horn 116, and/or geometry of the horn 116, may need to be altered, as compared to direct sonication.

In some embodiments, the system 100 can use multiple transducers 106 and/or horns 116 to agitate the solvent. In such embodiments, the transducers 116 can be arranged in patterns around the vessel 102 that point in a desired direction of wave propagation. For example, in some embodiments, the transducers 106 can be focused on a position of the compound 114, e.g., the location of the tablet, which can improve mixing efficiency. Further, use of multiple transducers 116 can further improve mixing efficiency by allowing for emission of signals at various frequencies. These frequencies can be tailored to each of the compound 114 and/or solvent to help promote more comprehensive dissolution of the compound 114.

Illustrative embodiments enable the ability to adjust system parameters, such as the amplitude setting frequency of applied ultrasonic signal, diameter of the horn 116, geometry of the horn 116, and the probe height D in certain manners to obtain certain results. For example, those system parameters may be adjusted to fit vessels of smaller volumes such as solvent volumes as low as 50 milliliters, thus enabling the system 100 to be portable while maintaining high specificity and sensitivity benchmarks. For example, as discussed above, conventional apparatuses for drug release testing typically use 1 liter of solvent, which limits testing to benchtop laboratory settings. Smaller volumes enabled by various embodiments, however, enable the system 100 to conduct accurate and repeatable kinetic release behavior testing in the field—outside of a benchtop laboratory setting. The system 100 can thus be useful in screening tablet quality outside of laboratory settings, and especially in low- and middle-income countries where substandard and counterfeit medicines often represent a deadly problem that can be difficult to detect. In some embodiments, the generator 104, transducer 106, and horn 116, along with the vessel 102, can be stored in a kit (not shown) to allow users to transport the system 100 to the remote testing sites.

After the system 100 is set up, the generator 104 can be activated to emit ultrasonic signals from the horn 116 into the vessel 102. Consequently, these signals agitate the sample 118 and promote dissolution of the compound 114 in the solvent 112 to form a solution. The solution can be sampled using the sampling system 108 during and/or after activation of the generator 104. Sampling can occur at a single point in time or over a plurality of time intervals. In some embodiments, the sampling system 108 can be configured for continuous sampling, which can allow solution to be pumped out of the vessel continuously. In some embodiments, sampling occurs at predetermined and/or randomly chosen instances throughout the testing process, though, it will be appreciated that in some embodiments the sampling can occur periodically.

Figure 2:
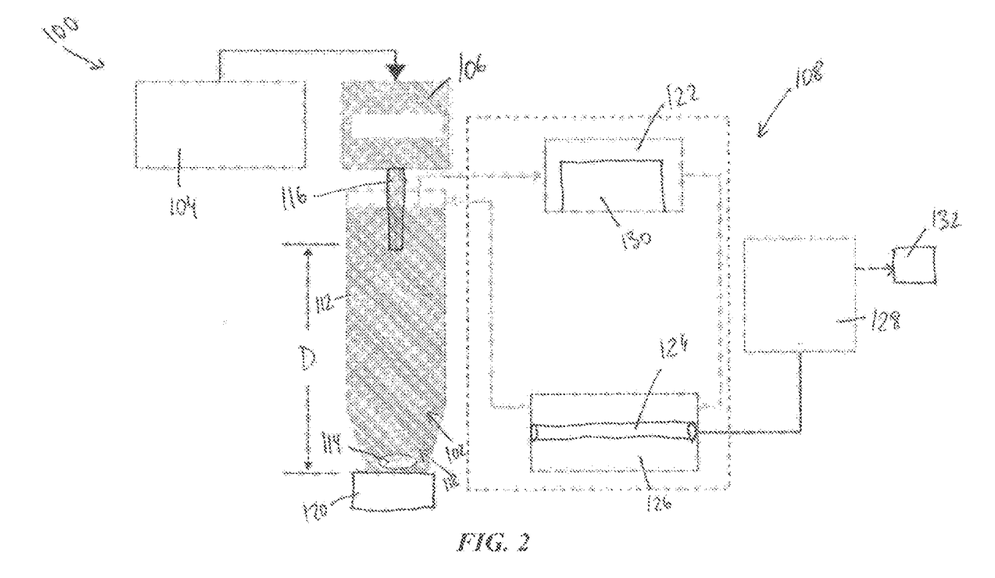
FIG. 2 schematically illustrates the system of FIG. 1 having a sampling system in communication therewith.

FIG. 2 schematically illustrates an illustrative embodiment of the sampling system or sample detection module 108 in greater detail as it cooperates with the remaining components shown in FIG. 1. Specifically, the sampling system 108 includes a pump 122, a cuvette 124 for holding the solution during testing, one or more testing apparatuses 126 to gather data, and a computer 128 to operate the system 100 and the sampling system 108. As suggested above, the sampling system 108 measures kinetic release behavior following dissolution testing of drugs. Drug release occurs by granules of compounds 114 breaking apart when exposed to solvents 112 in the presence of convective flow. As discussed above, agitation by the generator 104 can enhance drug release by inertial and stable cavitation events occurring near the outer surface of the tablet. This agitation results in microjetting that can break-apart fragments from the tablet surface, as well as cavitation events owing to the gas trapped in the tablets, thereby breaking the tablet into smaller fragments from the inside-out near the surface.

The pump 122 extracts the solution from the vessel for testing. Among others, the pump 122 can be a peristaltic pump, though, in some embodiments, the pump can be a centrifugal pump, positive displacement pump, hydraulic pump, syringe pump, peristaltic pump and/or pressure-based pump. The pump 122 can support various flowrates that can be based on the type of sampling. Some examples of flow rates can include ranges from approximately 0.5 mL/min to approximately 5 mL/min, from approximately 0.7 mL/min to approximately 3 mL/min, from approximately 0.8 mL/min to approximately 1 mL/min, or a value of approximately 0.85 mL/min. It will be appreciated that in some embodiments, the flowrate of the pump 122 is maximized to allow for compatibility with a maximum allowable pressure in the system, e.g., a maximum pressured drop that can be supported by the cuvette 124.

The pump 122 can include one or more inline filters 130. In illustrative embodiments, the inline filter 130 is configured to remove foreign substances and/or undissolved compound from the solution to ensure that foreign particulates do not clog and/or damage any parts of the sampling system 108. In some embodiments, the solution can be passed through a cannula filter (not shown) for preliminary filtering prior to entering the inline filter 130 and the pump 122. It will be appreciated that the cannula filter can be submerged in the vessel 102, though, in some embodiments the cannula filter can be positioned anywhere along the extraction of the solution by the sampling system 108.

The solution can pass from the pump 122 to the cuvette 124 for testing parameters of the solution in the testing apparatuses 126. The cuvette 124 can be a flow-through cuvette to receive and contain the solution for conducting measurements in the testing apparatuses 126. For example, in some embodiments, the cuvette 124 can be placed in a UV-Vis spectrophotometer to determine absorbance over time of the solution, though other tests can be performed on the solution, such as GC-MS, HPLC, spectral fluoroscopy, chemiluminescence, and so forth. In some embodiments, the cuvette 124 can allow for absorbance measurements as low as 100 nanometers, as low as 200 nanometers, or as low as 300 nanometers. It will be appreciated that minimizing a volume of the cuvette increases a turnover rate of the sample solution. After testing, the solution can be pumped back into the vessel 102, as shown, to maintain a closed-loop, constant volume system and/or to minimize waste, though, it will be appreciated that in some embodiments, the solution can also be discarded.

It will be appreciated that the testing apparatuses 126 can be interrogated for a variety of system parameters. Some examples of system parameters that can be interrogated can include absorbance, as discussed above, as well as concentration, and light reflection. In some embodiments, additional parameters such as dead-volume, flowrate, residence time, the amount of time that sampled solution spends in the sampling system 108, and so forth can be measured and collected for analysis of kinetic release curves.

In some embodiments, the testing apparatuses 126 can perform additional tests in addition to, or in lieu of, the kinetic release test. For example, the solution can be measured to quantitatively measure an amount of a specific ingredient or ingredients in the tablet. This test, which can be referred to as an endpoint test, can be used to determine an amount of active ingredient contained in the compound 112 by measuring the concentration of the compound dissolved in the solution. The endpoint test can quickly dissolve the compound 114 within the solvent 112 within a short period of time, e.g., approximately 5 minutes, such that the compound 114 is fully, or substantially, e.g., 90%, dissolved in the solvent 112. The endpoint test differs from tests for kinetic release behavior in that the endpoint test takes a single sample to quantify the content of the ingredient, whereas tests for kinetic release behavior include multiple samples over a plurality of time intervals to determine an amount of the ingredient that is released over time, e.g., 15 minutes, 30 minutes, one hour, two hours, and so forth. It will be appreciated that certain test parameters may differ for the endpoint test as compared to the kinetic release test. For example, parameters such as amplitude setting, frequency, probe height, horn diameter, and acoustic dosing can be chosen such that the total time to fully dissolve the compound 114 and form the solution 112 is minimized.

The testing apparatuses 126 can be associated with the computer 128 to compute results gathered from the data of the testing apparatuses 126. The computer 128 can be implemented as an external computer that connects to the testing apparatuses 126 via USB or integrally formed with one of the testing apparatuses. The computer 128 can process the results and prepare an output 132 based on the result. For example, the computer 128 can include a database having a repository of kinetic release behavior of various compounds, e.g., prednisone, acetaminophen, ibuprofen, and so forth, stored as reference data or waveforms. The reference data can be acquired by previously-tested samples containing a known compound 114 in solvent 112 having a verified amount of active ingredient, as discussed above, or by consulting literature values. Alternatively, the reference data can be supplied by a third party catalog of samples.

The computer 128 can be configured to compare the test data to the reference data to attempt to match the kinetic release behavior of the solution with the repository to find a match. The computer 128 can output any of a variety of indicia, such, a chart, a graph, e.g., kinetic release curves, and/or an overlay of the tested solution and the reference data to allow the user to compare the kinetic release behavior to identify the compound in the tested solution and to confirm the amount of active ingredient. In some embodiments, the output can indicate the existence of a match, a lack of a match, or the degree of a match between the tested compound and the reference data. Some additional examples of outputs 132 can include one or more audible signals, a light of various colors, a verbal confirmation by the system 100, and so forth.

The computer 128 produces the output 132 based on evaluating the dissolution testing measurements received from the testing apparatuses 126. For example, dissolution efficiency (DE) can be used as a general rate parameter to compare kinetic release curves across critical system parameters. Dissolution efficiency is defined as the area under the kinetic release curve divided by the total area of the plot bounded by the maximum achievable fraction dissolved and the length of the test and is given by the following equation:

$$DE = \int_0^t (\text{fract. dissolved}) \cdot dt / (\text{fract. dissolved})_{100} \cdot t$$

where (fract. dissolved)$_{100}$ refers to the maximum achievable fraction dissolved and t is the total length of the kinetic release test in seconds. Variability between dissolution efficiencies at the same system parameters are represented as percent coefficient of variation. It will be appreciated that dissolution testing measurements can also be evaluated using model dependent, model independent, and statistical approaches in lieu of, or in addition to, dissolution efficiency (DE).

In some embodiments, alternate configurations of the system 100 can be used to study the effect of system parameters on the kinetic release process. For example, techniques such as streak photography, particle image velocimetry, and laser Doppler anemometry can be used to explore fluid flow in these systems. Further, computational techniques can be used to model these multiphase flows in the parameter regimes of certain applications. Fluid flow determinations can be passed to the computer 128 for further information regarding the effects of system parameters on the kinetic release process.

Figure 3:
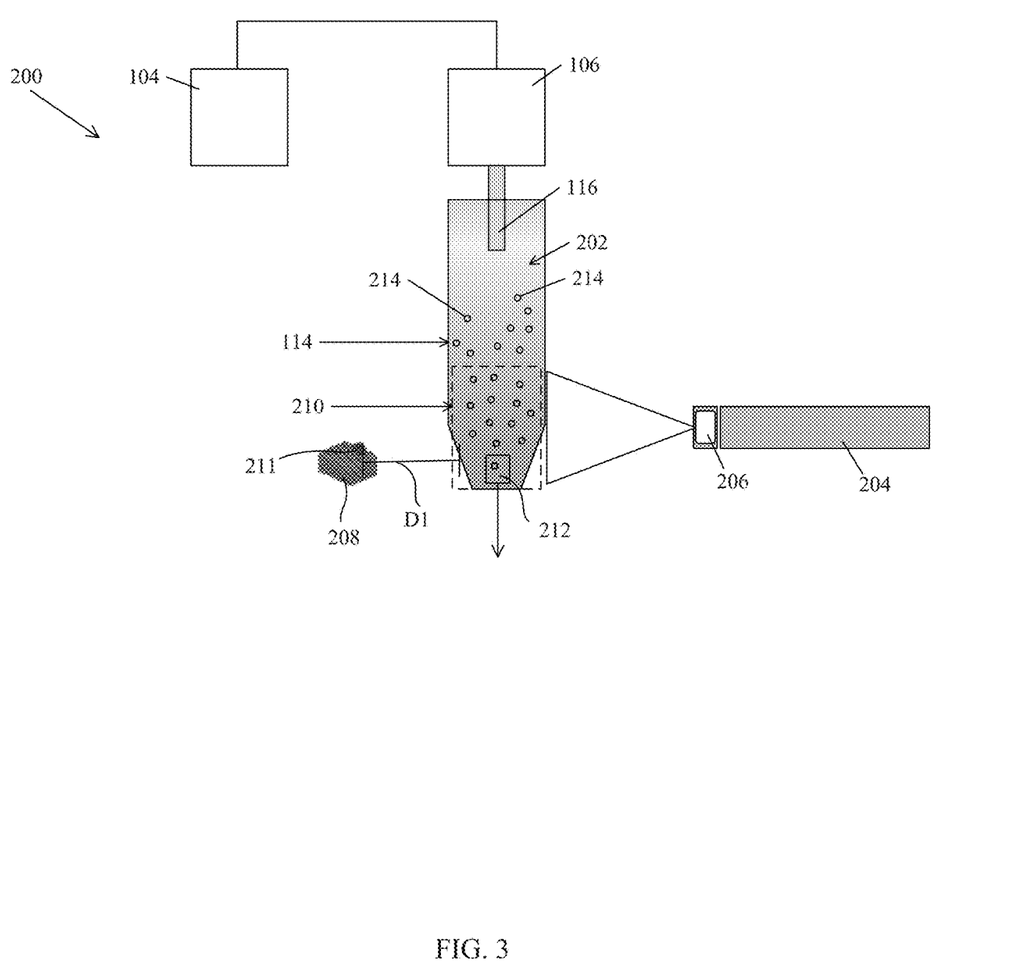
FIG. 3 schematically illustrates a system for performing streak photography experiments.

FIG. 3 schematically illustrates a flow characterization system 200 that can be used for streak photography experiments. Streak photography can be used to study the effects of system parameters on the acousto-hydrodynamic environment in the vessel. The flow characterization system 200 can include a vessel 202, a laser 204 having a lens 206, and a camera 208 to capture images of the compound 114 dissolving in the solvent 112. As shown, the vessel 202 can be illuminated by a sheet of light produced by the laser 204 to illuminate a field of view 210 within the vessel 202. The camera 208 can be positioned perpendicularly to the illuminated lens 206 at a specific distance D1 from the vessel, e.g., 100 mm, 200 mm, 250 mm, or 300 mm or more, to capture images of the region of interest 210. Among other things, the camera 208 can be a charge-coupled device (CCD) camera, complementary charge-coupled semiconductor (CMOS) camera, tape/film-based recording systems, such as a video camera, or a photodiode array.

One having ordinary skill in the art will appreciate that the distance D1 from a lens 211 of the camera 208 can be regulated such that the field of view 210 is captured within the images. The lens of the camera impacts the field of view 210 achieved at a particular distance D1, as well as a depth of the field achieved, which impacts the sharpness of the image for objects in different focal planes that move away from D1. The field of view 210 includes a region of interest 212, which can occur in proximity to the location that the compound 114 is located, and will be the subject of the streak photography determination.

In some embodiments, the vessel 202 can include glass spheres or beads 214 dispersed throughout the solvent 112 to interact with a sheet of light produced by the laser 204. For example, the beads 214 can flow through the sheet of light emitted by the laser 204 to disrupt the sheet of light such that the light reflects off the beads 214 and towards the camera 208. The beads 214 can be seeded at approximately 0.1% w/V in the vessel and can vary in size. For example, the beads 214 can be spherical with no concavities, though, in some embodiments, the beads 214 can be elliptical, or another similar shape. In some embodiments, the beads 214 can have an average diameter that ranges from approximately 1 µm to approximately 20 µm, approximately 5 µm to approximately 15 µm, approximately 8 µm to approximately 12 µm, or have a value of approximately 10 µm. The beads 214 can be made of a neutrally buoyant, reflective material.

In some embodiments, the beads 214 can be used to facilitate mixing. For example, the beads 214 can be included in a dissolution test to increase the rate of breakdown of the compound 114. The beads 214 can facilitate mixing by travelling through the solution during agitation to collide with the compound 114 to facilitate fracture of the compound 114, thereby dissolving the compound. It will be appreciated that the beads 214 can also be used with the system 100 discussed with respect to FIGS. 1 and 2 above.

After the amplitude settings and the probe height D are set, the generator 104 can be activated to turn on the horn 116. The camera 208 can be set to take images at a plurality of time intervals during horn operation at each parameter configuration tested. Images can be taken periodically, e.g., every 100 milliseconds for 10 seconds, or at various time intervals. The images can be processed and analyzed using the computer 128 to determine lengths of all the streak lines in pixels. For example, this determination can be performed by each pixel value in an object being replaced by the length of the object. The weighted values in a 200×200 pixel ROI centered above the bottom of the vessel 202 can be summed, and this sum is divided by the total number of pixels in the ROI to provide a weighted density in the ROI, subsequently referred to as a "flow score." In some embodiments, light intensity is directly proportional to the composition of the compound 114.

Figure 4:
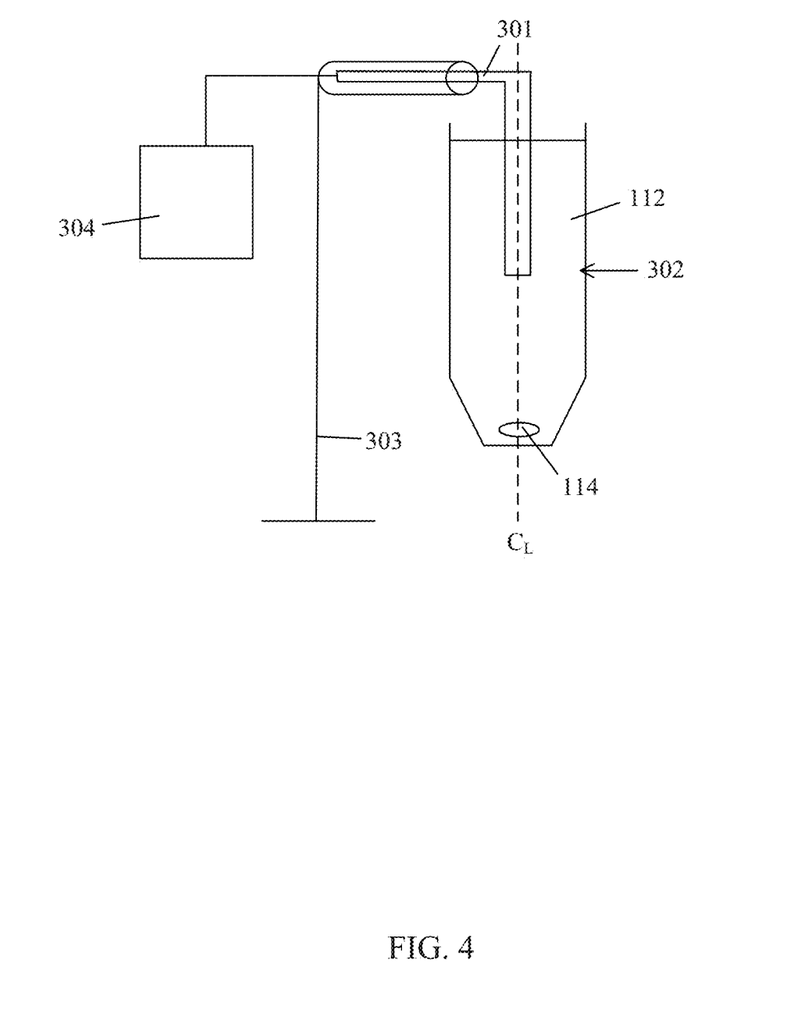
FIG. 4 schematically illustrates a system for hydrophone testing.

Hydrophone measurements can be used to study the effects of system parameters on the acousto-hydrodynamic environment in the vessel. For example, FIG. 4 schematically illustrates an acoustic characterization system 300 that can take hydrophone measurements. For example, a needle hydrophone 301 can be submerged in a vessel 302 having the solvent 112 and the compound 114. The radial position of the hydrophone 301 within the vessel 302 can vary. In some embodiments, the hydrophone 301 can be placed approximately halfway between a centerline CL of the vessel 302 and the walls of the vessel to minimize cavitation damage to the hydrophone, though, it will be appreciated that this position can be varied to measure the pressure magnitudes in the radial directions. The acoustic characterization system 300 can include a mount 303 that controls a height of the hydrophone 302 to also measure pressure magnitudes in the axial direction.

The hydrophone 301 also can be connected to an oscilloscope 304. In some embodiments, waveform data for horn pulses can be recorded along the z-axis of the vessel at 2 mm increments from 0-30 mm, with 0 mm being the bottom of the vessel. Pressure magnitudes can be calculated as running averages of peak-to-peak voltages (Vpp) from the waveform data. Vpp measurements can be taken for two different test tube boundary conditions: (1) vessel exposed to air and (2) vessel exposed to large water bath. In some embodiments, Vpp measurements for each condition can be normalized by the highest value at that condition to calculate a relative pressure amplitude at each height along the vessel.

Figure 5:
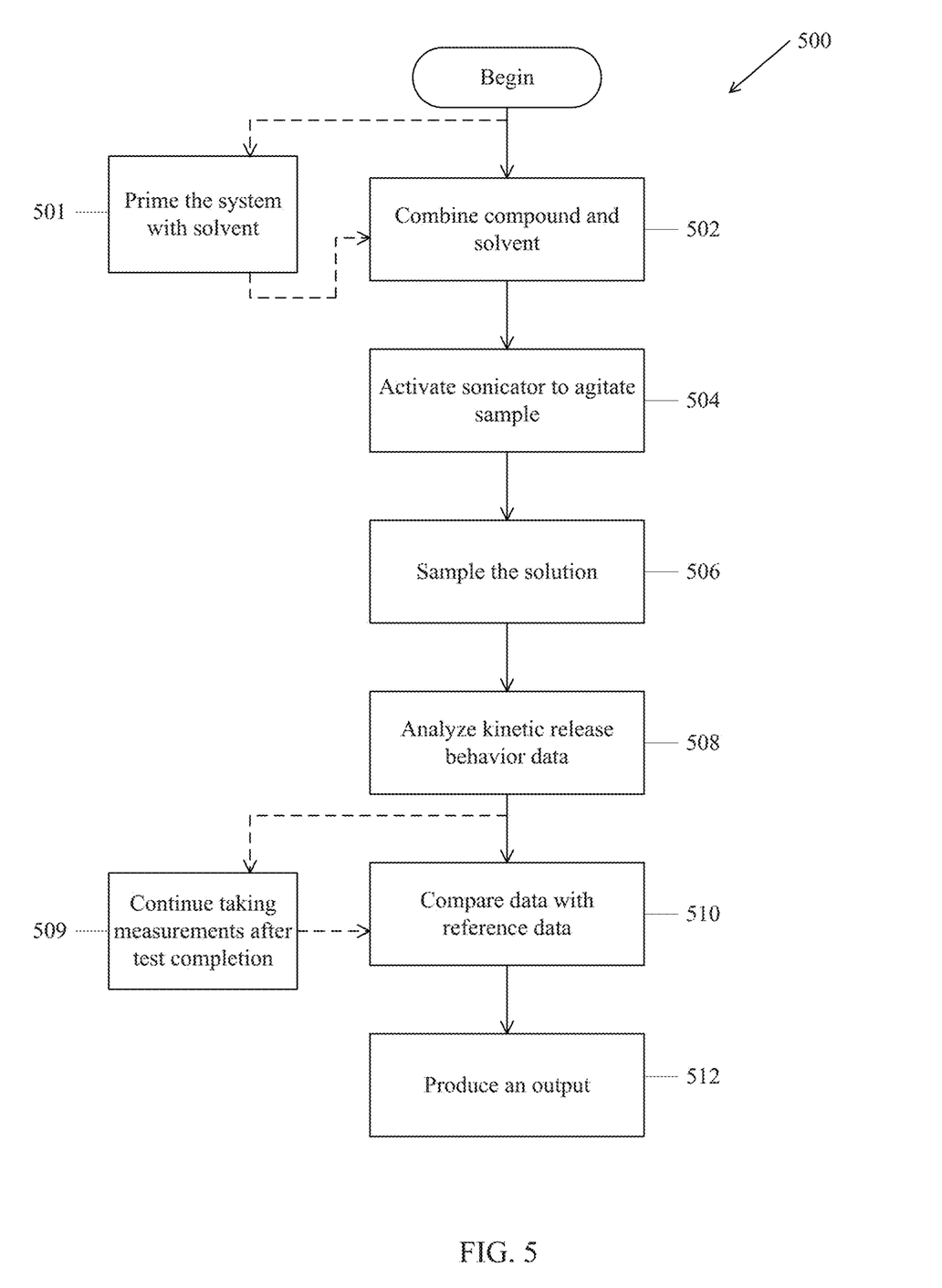
FIG. 5 illustrates a flowchart of an exemplary method using the systems and device disclosed herein.

FIG. 5 illustrates an exemplary method 400 for performing kinetic release testing. It should be noted that this process is simplified from a longer process that normally would be used to test a sample. Accordingly, the process can have additional steps that those skilled in the art likely would use. In addition, some of the steps may be performed in a different order than that shown, or at the same time. Those skilled in the art therefore can modify the process as appropriate. Moreover, as noted above and below, materials and structures noted are but one of a wide variety of different materials and structures that may be used. Those skilled in the art can select the appropriate materials and structures depending upon the application and other constraints. Accordingly, discussion of specific materials and structures is not intended to limit all embodiments.

The process 500 begins at step 502 by combining the compound 114 and the solvent 112 to form the sample 118. The compound 114 can be added to the solvent 112 or vice versa to form the sample 118. In some embodiments, the system 100 can be primed with the solvent 112 prior to introducing the compound 114 (step 501). For example, the vessel 102 can be filled with solvent and sampled over a certain time period to establish baseline measurements of the solvent 112. Sampling can occur for two minutes, for three minutes, for five minutes, or more. After establishing the baseline measurements, the compound 114 can be added to the vessel 102 and the generator 104 can be activated to turn on the horn 116.

Next, the transducer 106 can be positioned within the sample 118 and activated to agitate the sample 118 (step 504). As discussed above, agitating the sample 118 dissolves the compound 114 within the solvent, transforming the sample 118 into a solution. At step 506, the solution can be sampled during and/or after agitation to measure and collect data regarding kinetic release behavior of the dissolved compound. Sampling can take place at a plurality of time intervals and/or continuously to collect data as the compound dissolves. The kinetic release behavior data, such as absorbance and/or concentration of an amount of one or more ingredients, e.g., an active ingredient or another component of the compound, can be analyzed and/or computed by the computer 128 or another device based on the system parameters (step 508). It will be appreciated that in some embodiments, the instantly disclosed methods can be used to detect impurities or other components of the compound.

In some embodiments, after sampling is complete, the generator 104 can remain activated, or be powered on if previously turned off. Agitation can continue for a period of time, e.g., 5 minutes, at an elevated amplitude setting, e.g., 50%, to ensure complete drug release. The horn 116 can be turned off and sampling can continue for a period of time, e.g., 5-7 minutes, to collect further absorbance measurements (step 509). This test can be repeated for multiple tablets by varying amplitude settings, frequency of applied ultrasonic signal, diameter of the horn, geometry of the horn, probe height D, acoustic dosage, and/or solvent content to gather average kinetic release behavior for comparison with reference data. The values of amplitude setting and probe height D can be varied, for example in the ranges discussed above, to obtain multiple data points for consideration, as well as to ensure that the parameter set results in the test operating in a low variability regime. It will be appreciated that the system can be flushed between tests of each table and dried to avoid contamination.

At step 510, the computer 128 can compare the computed kinetic release behavior data to reference data sets of kinetic release behaviors. The comparison can yield an identification of the compound 114 in the sample 118 and/or determine whether the compound 114 contains an amount of active ingredient that is within an acceptable range. The computer 128 can produce an output 132 based on the outcome of this comparison for analysis of kinetic behaviors (step 512).

The methods described above offer a few distinct advantages. For example, as discussed above, these methods use a volume that is up to a factor of 20× smaller compared to compendia dissolution tests, which minimizes the weight of the liquid reagents required. This small volume decreases the cost per tablet dissolved and also allows for affordability and portability of the system. For example, coupling this test with a portable analysis method is expected to allow for screening tablet quality outside of laboratory settings in low- and middle-income countries, where substandard and counterfeit medicines often represent a deadly problem and are difficult to detect.

A person having ordinary skill in the art will appreciate that the lower volume also increases the analytical sensitivity, which reduces the amount of drug required for testing, a potential boon for kinetic release testing at the early stages of drug and dosage form development. Further, the systems and methods increase access to dissolution-like data, especially in point-of-care and field-based applications. It will be appreciated that non-physiologically relevant media allows complete solubility of drug from tablet samples even at lower volumes. Kinetic release curves generated in one or multiple types of media can serve as a potential fingerprint of the manufacturing quality of a tablet.

EXAMPLES

Example 1

Kinetic release testing of tablet samples was performed using the experimental setup described in FIGS. 1 and 2. Prednisone tablets dissolved in 20% ethanol solution were used as a model system. 53 mL 20% ethanol solution was dispensed into the test vessel. The system was primed with media for 5 min. After priming, absorbance measurements were taken for 80 sec to establish a baseline. A prednisone tablet was then inserted into the vessel and the horn was turned on. Ultrasonic agitation was applied to the test media for up to 3600 sec. At the end of the test, ultrasonic agitation was applied to the dissolved tablet solution for 5 min at 50% amplitude setting to ensure complete drug release. The horn was shut off, and absorbance measurements continued for 6 minutes. The system was flushed with fresh 20% ethanol solution for 10 min and dried out using air after each test. Three tablets were tested at each parameter configuration. Kinetic release testing was performed for amplitude settings of 30%, 35%, 40%, and 45% at probe heights of 35 mm, 45 mm, and 55 mm.

Figure 6:
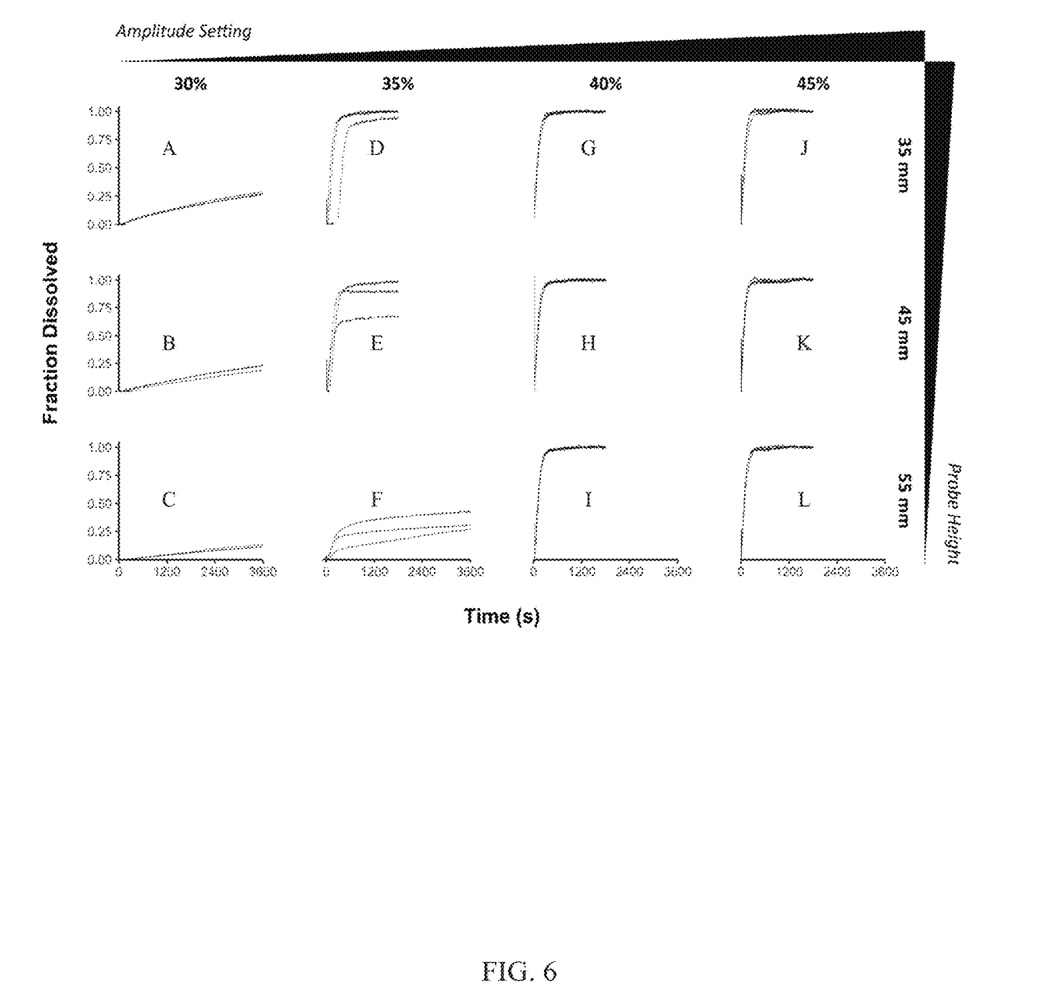
FIG. 6 illustrates kinetic release curves modeled after different combinations of amplitude setting and probe height for prednisone tablets.

FIG. 6 graphically illustrates an exemplary embodiment of curves that are plotted based on these different combinations of amplitude setting and probe height D in which three tablets were dissolved at each combination at a fixed acoustic dosage, e.g., 1 Hz at 50% duty cycle, according to the system 100 described in Example 1. The curves illustrate kinetic release profiles of USP PVT prednisone tablets in 20% ethanol solution dissolved using ultrasonic agitation at 12 different combinations of amplitude setting and probe height D. As shown, kinetic release testing was performed for amplitude settings of 30%, 35%, 40%, and 45% at probe heights of 35 mm, 45 mm, and 55 mm to determine the fraction of the tablets dissolved over time.

As a result of analysis of kinetic release behavior at these various system parameters, kinetic release behavior can be seen to fall into 3 regimes: a slow regime, a fast regime, and a transition regime. Each regime can be characterized by a unique interplay between the compound disintegration and convective fluid flow in the test vessel.

For example, in the slow regime, tablet disintegration can occur over approximately 200 seconds of ultrasonic agitation, which suggests modest fluid penetration into the tablet and cavitation. The convective flow in this regime is not strong enough to cause circulation of tablet fragments throughout the vessel 102, and tablet fragments end up spread out along the bottom of the vessel. Undissolved fragments on the top layer are the only fragments to undergo diffusive mass removal due to convective fluid flow and inertial cavitation events.

As shown in FIG. 6, the slow regime is observed for all probe heights D at an amplitude setting of 30%. The slow regime is characterized by a steady increase in fraction dissolved over 1 hour of ultrasonic agitation with no probe height resulting in a fraction dissolved greater than 0.25, as shown in graphs (A), (B), and (C).

In the fast regime, the tablet is rapidly disintegrated into smaller fragments over approximately the first 30 seconds of ultrasonic agitation. The convective fluid flow in this regime is strong enough to cause circulation of tablet fragments throughout the vessel 102. All tablet fragments undergo diffusive mass removal by convective flow and further fragmentation by inertial cavitation events.

As shown in FIG. 6, the fast regime is observed for all probe heights at amplitude settings of greater than or equal to 40%. The fast regime is characterized by rapid increases in fraction dissolved as soon as ultrasonic agitation is applied followed by slowed approach to, and a plateau at, 100% dissolved, as shown in graphs (G)-(L).

In the transition regime, tablet disintegration can occur between 30-200 seconds, depending on the flow and cavitation behavior. The onset, extent, and duration of circulation of tablet fragments in this regime is stochastic, so the number of fragments exposed to convective flow and inertial cavitation differs from run-to-run for a given parameter set. The dissolution efficiencies produced in each regime reflect these observations. For the slow and fast regimes, dissolution efficiencies fall in distinct ranges, and variability between trials is low. In the transition regime, the range of achievable dissolution efficiencies is much wider, and variability between trials is high.

As shown in FIG. 6, the transition regime is observed at all probe heights at an amplitude setting of 35%. The transition regime is characterized by high variability in the shape of the kinetic release profiles and a strong relationship between probe height and fraction dissolved after 1 hour, as shown in graphs (D)-(F).

In particular, visual observations reveal the primary difference between slow and fast release regimes to be the rapid, near-turbulent convective transport of fragments away from the bottom of the vessel into the bulk of the container. This behavior and the similar increases in dissolution efficiency and flow score, with amplitude setting and probe height D, which can be determined from the testing methods disclosed above, suggest that acoustic streaming velocity mainly controls the slow-fast transition. Axial velocity in the compound region of the vessel as measured from the horn tip directly interacting with the cavitation-fragmented tablet, at a given combination of amplitude setting and probe height D, can result in advection of fragments up into the volume of the vessel exposing fragments to higher levels of cavitation and flow.

Kinetic release behavior can therefore display a highly repeatable and controllable transition between a slow and fast regime dependent on the acoust-hydrodynamic environment. For example, the combination of acoustic cavitation and acoustic streaming flow can control and accelerate the release process. Interactions between drug, tablet formulation, and solvents can also determine kinetic release behavior by affecting the rate and extent of compound disintegration and drug diffusion.

The embodiments of the invention described herein are intended to be merely exemplary; variations and modifications will be apparent to those skilled in the art. All such variations and modifications are intended to be within the scope of the present invention as defined in any appended claims.

We claim:

1. A method for testing characteristics of a compound in the form of a tablet, the method comprising:
   sampling a solvent prior to combining the tablet with the solution to establish a baseline measurement of the solvent;
   combining the tablet with the solvent to form a combination;
   activating a sonicator, the sonicator configured to produce both cavitation and acoustic streaming in the combination to agitate the combination to transform the combination into a solution;
   sampling the solution at a plurality of time intervals to produce a plurality of samples;
   determining kinetic release behavior of the compound in solution as a function of data related to the samples;
   comparing the data of the kinetic release behavior of the compound in solution with a reference data set of kinetic release behavior of the compound to form a result, the result comprising one of identifying the compound, and a determination of whether the compound contains an amount of an ingredient that is within an acceptable range; and
   producing an output based on the result.

2. The method of claim 1, wherein the sonicator is configured to produce both cavitation and acoustic streaming in the combination to dissolve the tablet into the solvent to transform the combination into the solution.

3. The method of claim 1, further comprising coupling the sonicator to a horn for agitating the sample to transform the combination into the solution.

4. The method of claim 3, further comprising adjusting one or more of an amplitude setting of the sonicator, frequency of applied ultrasonic signal, diameter of the horn, and geometry of the horn to change a rate of transformation of the combination into the solution.

5. The method of claim 3, further comprising adjusting a probe height of the horn to change a rate of transformation of the combination into the solution.

6. The method of claim 1, further comprising adjusting an acoustic dosing of the sonicator to change an amount of acoustic energy delivered to the combination per unit time.

7. The method of claim 1, wherein sonicator is further configured to produce micro-streaming in addition to both cavitation and acoustic streaming.

8. The method of claim 1, wherein the output identifies the compound.

9. The method of claim 1, wherein the solution is in a vessel, and wherein sampling the solution comprises extracting the solution from the vessel, and wherein the method further comprises, subsequent to the sampling the solution, returning the solution to the vessel.

10. The method of claim 1, wherein the combination is disposed in a vessel, and the sonicator is disposed external to the vessel when transforming the sample into the solution.

11. A method for quantifying target release of a compound, the method comprising:
sampling a solvent prior to combining the tablet with the solution to establish a baseline measurement of the solvent;
combining the compound with the solvent to form a combination;
agitating the combination to dissolve the compound within the solvent using ultrasonic agitation to produce both cavitation and acoustic streaming in the combination to transform the combination into a solution, the compound releasing one or more ingredients during dissolution;
collecting a plurality of samples of the dissolved compound at a corresponding plurality of time intervals;
detecting an amount of the one or more ingredients in the samples to determine a value;
comparing the value to a reference value; and
generating an output that describes a relationship between the value and the reference value.

12. The method of claim 11, wherein the collecting occurs during agitation of the combination.

13. The method of claim 11, further comprising adjusting one or more of an amplitude setting of the ultrasonic agitation, acoustic dosing of the sonicator, probe height of a horn, frequency of applied ultrasonic signal, diameter of a horn, and geometry of a horn to change a rate of transformation of the combination into the solution.

14. The method of claim 11, further comprising adjusting a height from which the agitation is emitted to change a rate of transformation of the combination into the solution.

15. The method of claim 11, wherein the output comprises an identity of the compound.

* * * * *